United States Patent
Johnson et al.

(10) Patent No.: US 12,297,902 B1
(45) Date of Patent: May 13, 2025

(54) PLANETARY GEARBOX

(71) Applicant: Schaeffler Technologies AG & Co. KG, Herzogenaurach (DE)

(72) Inventors: Joseph Johnson, Mooresville, NC (US); Nicholas Hrusch, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/678,032

(22) Filed: May 30, 2024

(51) Int. Cl.
*F16H 57/08* (2006.01)
*F16H 1/28* (2006.01)
*F16H 57/029* (2012.01)

(52) U.S. Cl.
CPC ............. *F16H 57/082* (2013.01); *F16H 1/28* (2013.01); *F16H 57/029* (2013.01)

(58) Field of Classification Search
CPC ..... F16H 1/28; F16H 1/36; F16H 3/46; F16H 3/52; F16H 57/082; F16H 57/085
See application file for complete search history.

(56) References Cited

U.S. PATENT DOCUMENTS

| | | | | |
|---|---|---|---|---|
| 2014/0141931 | A1* | 5/2014 | Ishizuka | F16H 1/28 |
| | | | | 475/348 |
| 2016/0377163 | A1* | 12/2016 | Ziskovsky | F16H 57/02 |
| | | | | 475/331 |
| 2020/0106324 | A1* | 4/2020 | Kobayashi | H02K 5/10 |
| 2021/0399608 | A1 | 12/2021 | Gandalfi et al. | |

FOREIGN PATENT DOCUMENTS

| | | | | |
|---|---|---|---|---|
| CN | 109751366 B | * | 2/2022 | |
| CN | 114087323 A | * | 2/2022 | |
| CN | 217152849 U | * | 8/2022 | |
| WO | WO-2016194423 A1 | * | 12/2016 | ........... B60K 17/046 |

\* cited by examiner

*Primary Examiner* — Stacey A Fluhart

(57) ABSTRACT

A planetary gearbox includes a gearbox housing, a sun gear arranged for receiving an input torque, a ring gear rotationally fixed in the gearbox housing, and a planetary assembly arranged to transmit an output torque. The planetary assembly includes a planetary carrier, sealed to the gearbox housing, a plurality of planetary shafts, a plurality of planetary gears, each arranged on one of the plurality of planetary shafts and drivingly engaged with the sun gear and the ring gear, and a vent arranged in the planetary carrier for equalizing pressure in the planetary gearbox.

17 Claims, 1 Drawing Sheet

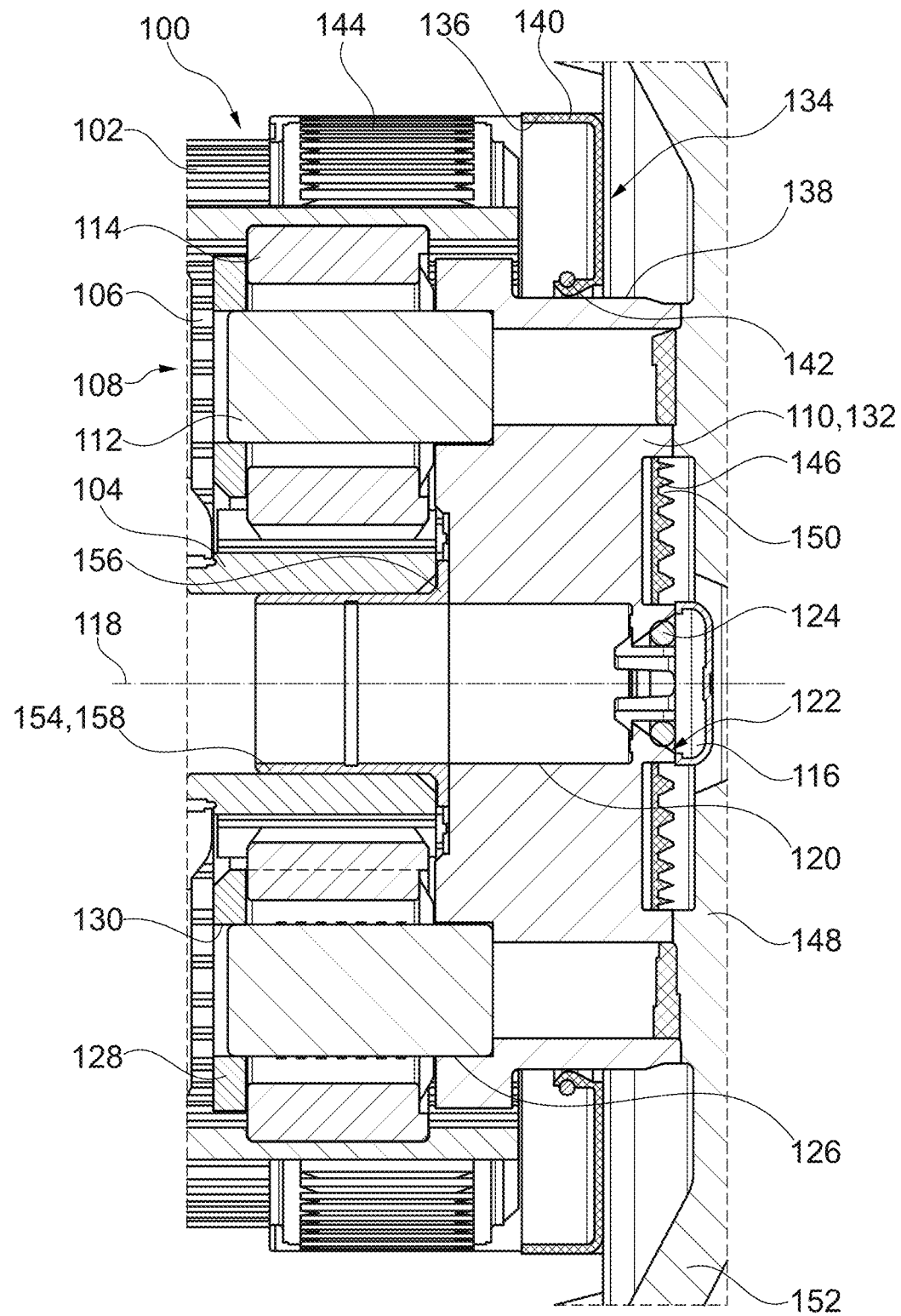

PLANETARY GEARBOX

TECHNICAL FIELD

The present disclosure relates generally to a gearbox, and more specifically to a planetary gearbox.

BACKGROUND

Planetary gearboxes are known. One example is shown and described in United States Patent Application Publication No. 2021/0399608 titled A DRIVE TRAIN to Gandalfi et al.

SUMMARY

Example aspects broadly comprise a planetary gearbox including a gearbox housing, a sun gear arranged for receiving an input torque, a ring gear rotationally fixed in the gearbox housing, and a planetary assembly arranged to transmit an output torque. The planetary assembly includes a planetary carrier, sealed to the gearbox housing, a plurality of planetary shafts, a plurality of planetary gears, each arranged on one of the plurality of planetary shafts and drivingly engaged with the sun gear and the ring gear, and a vent arranged in the planetary carrier for equalizing pressure in the planetary gearbox.

In an example embodiment, the planetary gearbox includes a central axis, the planetary assembly is rotatable about the central axis, and the vent includes a center disposed on the central axis. In an example embodiment, the vent is arranged to permit a flow of gases through the vent and prevent a flow of liquids through the vent. In some example embodiments, the planetary carrier has a tapered hole and the vent is arranged in the tapered hole. In an example embodiment, the vent includes an o-ring seal for sealing the vent in the tapered hole.

In some example embodiments, the planetary shafts are pressed into bores arranged in the planetary carrier. In an example embodiment, the bores are counterbores extending axially through an entirety of the planetary carrier. In some example embodiments, the planetary carrier includes an axially distal flange and the plurality of planet pins each extend into respective bores in the axially distal flange. In an example embodiment, the planetary carrier also includes a main body and the plurality of planetary gears are disposed axially between the axially distal flange and the main body.

In some example embodiments, the planetary gearbox also includes a seal. The gearbox housing includes an inner circumferential surface, the planetary carrier includes an outer circumferential surface, and the seal includes a metal ring fixed on the inner circumferential surface and a flexible sealing member, fixed to the metal ring and sealingly engaged with the outer circumferential surface. In an example embodiment, the gearbox housing includes an outer spline arranged for press-fitting into a device housing.

In some example embodiments, the planetary carrier includes an axial spline for transmitting the output torque. In an example embodiment, the axial spline circumscribes the vent. In some example embodiments, the planetary gearbox also includes an output flange, and the output flange has a mating spline drivingly engaged with the axial spline. In an example embodiment, the output flange is bolted to the planetary carrier. In an example embodiment, the output flange surrounds at least a portion of the gearbox housing.

In some example embodiments, the planetary gearbox also includes a bushing, and the bushing has a flange disposed axially between the sun gear and the planetary carrier. In an example embodiment, the sun gear has a central bore, the bushing also includes a tubular portion extending from the flange, and the tubular portion is disposed in the central bore.

BRIEF DESCRIPTION OF THE DRAWINGS

The single FIGURE illustrates a cross-sectional view of a planetary gearbox according to an example aspect of the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following description is made with reference to the single FIGURE. The single FIGURE illustrates a cross-sectional view of planetary gearbox 100 according to an example aspect of the present disclosure. Planetary gearbox 100 includes gearbox housing 102, sun gear 104 arranged for receiving an input torque, ring gear 106 rotationally fixed in the gearbox housing, and planetary assembly 108 arranged to transmit an output torque. In the embodiment shown, ring gear 106 is integrally formed with gearbox 102 from a same piece of material. Other embodiments, not shown may include a ring gear formed as a separate component having an external spline engaged with an internal spline on gearbox housing 102, for example, that rotationally fixes the ring gear in the housing such that, when the housing is rotationally fixed (e.g., not rotating), the ring gear does not rotate. Planetary assembly 108 includes planetary carrier 110, sealed to the gearbox housing, planetary shafts 112, planetary gears 114, each arranged on one of the planetary shafts and drivingly engaged with the sun gear and the ring gear, and vent 116 arranged in the planetary carrier for equalizing pressure in the planetary gearbox. By drivingly engaged, we mean that the sun gear, ring gear and planetary gears include intermeshing gear teeth that engage during rotation of the components in a known manner.

Planetary gearbox 100 includes central axis 118 and planetary assembly 108 is rotatable about central axis 118. Vent 116 includes a center disposed on the central axis. The vent may be a round vent aligned with central bore 120 of planetary carrier 110, for example. Vent 116 is arranged to permit a flow of gases through the vent, and prevent a flow of liquids through the vent. Vent 116 may be a Gore® Protective Vent manufactured by W. L. Gore & Associates GmbH, for example, and may include a thin polyamide membrane which allows air to pass in and out, but prevents oil or other liquids from passing through. In the embodiment shown, planetary carrier 110 includes tapered hole 122 and vent 116 is arranged in the tapered hole via a snap-in feature, although other embodiments (not shown) may include a threaded hole and threaded vent, for example. Vent 116 includes o-ring seal 124 for sealing the vent in the tapered hole.

Planetary shafts 112 are pressed into bores 126 arranged in the planetary carrier. As shown in the FIGURE, bores 126 are counterbores extending axially through an entirety of the planetary carrier. In other words, bores 126 each have a larger diameter for receiving the planetary shaft and a smaller diameter extending through the planetary carrier, with an interface between the two diameters forming a seat for the planetary shaft. By pressed in, we mean that the shafts must be forcefully inserted into bores 126 and the resulting friction retains the shafts in the bores during operation. Other methods such as clips, welding, adhesives, etc. may also be employed to retain shafts 112 in bores 126. Planetary carrier 110 includes axially distal flange 128 and the planet pins extend into bores 130 in the axially distal flange. Planetary carrier 110 also includes main body 132 and planetary gears 114 are disposed axially between the axially distal flange and the main body. Flange 128 and body 132 may be connected via webs not shown in the cross-sectional view shown in the FIGURE, for example.

Planetary gearbox 100 also includes seal 134. Gearbox housing 102 includes inner circumferential surface 136 and planetary carrier 110 includes outer circumferential surface 138. Seal 134 includes metal ring 140 fixed on the inner circumferential surface and flexible sealing member 142, fixed to the metal ring and sealingly engaged with the outer circumferential surface. Member 142 may be manufactured from rubber, and fixed to the metal ring by overmolding, for example. Gearbox housing 102 includes outer spline 144 arranged for press-fitting into a device housing (not shown). That is, during assembly, spline 144 may be engaged in a bore of the device housing by force so that the teeth of the outer spline cut into the device housing, rotationally fixing the gearbox housing in the outer housing. The device housing bore may be smooth or may include partially formed teeth aligned with the outer spline for easier assembly, for example.

Planetary carrier 110 includes axial spline 146 for transmitting the output torque. Axial spline 146 may be one half of a Hirth joint or Hirth coupling, for example, with radially extending tapered teeth. Axial spline 146 circumscribes the vent. That is, the spline teeth are arranged circumferentially about central axis 118 at a diameter greater than an outer diameter of the vent. Planetary gearbox 100 also includes output flange 148 with mating spline 150 drivingly engaged with the axial spline. That is, mating spline 150 forms the other half of the Hirth joint or Hirth coupling described above. Output flange 148 is bolted to planetary carrier 110 via bolts (not shown) to secure splines 146 and 150 together to transmit the output torque to the output flange. Output flange 148 includes conical portion 152 (only partially shown in the FIGURE) that surrounds a portion of gearbox housing 102.

Planetary gearbox 100 also includes bushing 154 with flange 156 disposed axially between sun gear 104 and planetary carrier 110. Sun gear 104 includes a central bore and the bushing includes tubular portion 158 extending from the flange and disposed in the central bore.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Planetary gearbox
102 Gearbox housing
104 Sun gear
106 Ring gear
108 Planetary assembly
110 Planetary carrier
112 Planetary shafts
114 Planetary gears
116 Vent
118 Central axis
120 Central bore (planetary carrier)
122 Tapered hole
124 O-ring seal (vent)
126 Bores (planetary carrier)
128 Axially distal flange (planetary carrier)
130 Bores (axially distal flange)
132 Main body (planetary carrier)
134 Seal
136 Inner circumferential surface (gearbox housing)
138 Outer circumferential surface (planetary carrier)
140 Metal ring (seal)
142 Flexible sealing member (seal)
144 Outer spline (gearbox housing)
146 Axial spline
148 Output flange
150 Mating spline (output flange)
152 Conical portion (output flange)
154 Bushing
156 Flange (bushing)
158 Tubular portion (bushing)

What is claimed is:

1. A planetary gearbox, comprising:
a central axis;
a gearbox housing;
a sun gear arranged for receiving an input torque;
a ring gear rotationally fixed in the gearbox housing; and
a planetary assembly rotatable about the central axis and arranged to transmit an output torque, the planetary assembly comprising:
a planetary carrier, sealed to the gearbox housing;
a plurality of planetary shafts;
a plurality of planetary gears, each arranged on one of the plurality of planetary shafts and drivingly engaged with the sun gear and the ring gear; and
a vent arranged in the planetary carrier for equalizing pressure in the planetary gearbox and comprising a center disposed on the central axis.

2. The planetary gearbox of claim 1 wherein the vent is arranged to:
permit a flow of gases through the vent; and
prevent a flow of liquids through the vent.

3. The planetary gearbox of claim 1 wherein:
the planetary carrier comprises a tapered hole; and
the vent is arranged in the tapered hole.

4. The planetary gearbox of claim 3 wherein the vent comprises an o-ring seal for sealing the vent in the tapered hole.

5. The planetary gearbox of claim 1 wherein the planetary shafts are pressed into bores arranged in the planetary carrier.

6. The planetary gearbox of claim 5 wherein the bores are counterbores extending axially through an entirety of the planetary carrier.

7. The planetary gearbox of claim 1 wherein;
the planetary carrier comprises an axially distal flange; and
the plurality of planetary shafts each extend into respective bores in the axially distal flange.

8. The planetary gearbox of claim 7 wherein:
the planetary carrier further comprises a main body; and
the plurality of planetary gears are disposed axially between the axially distal flange and the main body.

9. The planetary gearbox of claim 1 further comprising a seal, wherein:
the gearbox housing comprises an inner circumferential surface;
the planetary carrier comprises an outer circumferential surface; and
the seal comprises:
a metal ring fixed on the inner circumferential surface; and
a flexible sealing member, fixed to the metal ring and sealingly engaged with the outer circumferential surface.

10. The planetary gearbox of claim 1 wherein the gearbox housing comprises an outer spline arranged for press-fitting into a device housing.

11. The planetary gearbox of claim 1 wherein the planetary carrier comprises an axial spline for transmitting the output torque.

12. The planetary gearbox of claim 1 further comprising a bushing, the bushing comprising a flange disposed axially between the sun gear and the planetary carrier.

13. The planetary gearbox of claim 12 wherein:
the sun gear comprises a central bore; and
the bushing further comprises a tubular portion extending from the flange; and
the tubular portion is disposed in the central bore.

14. A planetary gearbox, comprising:
a gearbox housing;
a sun gear arranged for receiving an input torque;
a ring gear rotationally fixed in the gearbox housing; and
a planetary assembly arranged to transmit an output torque, the planetary assembly comprising:
a planetary carrier, sealed to the gearbox housing and comprising an axial spline for transmitting the output torque;
a plurality of planetary shafts;
a plurality of planetary gears, each arranged on one of the plurality of planetary shafts and drivingly engaged with the sun gear and the ring gear; and
a vent arranged in the planetary carrier for equalizing pressure in the planetary gearbox, wherein the axial spline circumscribes the vent.

15. The planetary gearbox of claim 14 further comprising an output flange, wherein the output flange comprises a mating spline drivingly engaged with the axial spline.

16. The planetary gearbox of claim 15 wherein the output flange is bolted to the planetary carrier.

17. The planetary gearbox of claim 15 wherein the output flange surrounds at least a portion of the gearbox housing.

* * * * *